(12) United States Patent
Thomas et al.

(10) Patent No.: US 9,378,029 B2
(45) Date of Patent: Jun. 28, 2016

(54) RULES BASED USER INTERFACE ARCHITECTURE

(71) Applicant: Sharp Laboratories of America, Inc., Camas, WA (US)

(72) Inventors: John Thomas, Portland, OR (US); Daniel Klave, Camas, WA (US); Joseph Murdock, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 338 days.

(21) Appl. No.: 14/216,276

(22) Filed: Mar. 17, 2014

(65) Prior Publication Data

US 2015/0261416 A1 Sep. 17, 2015

(51) Int. Cl.
*G06F 9/44* (2006.01)

(52) U.S. Cl.
CPC .................................. *G06F 9/4443* (2013.01)

(58) Field of Classification Search
CPC ..................................................... G06F 9/4443
USPC ........................................................ 715/771
See application file for complete search history.

(56) References Cited

U.S. PATENT DOCUMENTS

| 7,047,088 B2* | 5/2006 | Nakamura | G06F 3/1204 358/1.15 |
| 7,594,181 B2* | 9/2009 | Rothwein | G06F 8/38 715/747 |
| 7,624,350 B2* | 11/2009 | Garg | G06F 9/4443 715/744 |
| 7,747,941 B2* | 6/2010 | Campbell | G06F 17/243 715/234 |
| 8,024,281 B2* | 9/2011 | Proctor | G06N 5/025 706/47 |
| 8,032,131 B2* | 10/2011 | Dobson | H04L 41/5009 370/244 |
| 8,402,373 B2* | 3/2013 | Ferlitsch | G06F 9/4443 709/203 |
| 8,418,070 B2* | 4/2013 | Mayer-Ullmann | G06F 8/38 715/235 |
| 8,418,072 B1* | 4/2013 | Bauer | G06F 8/38 709/223 |
| 8,589,817 B2* | 11/2013 | Fukimoto | G06F 3/04895 715/744 |
| 2003/0033395 A1* | 2/2003 | Sato | G06F 3/1204 709/223 |

(Continued)

FOREIGN PATENT DOCUMENTS

| WO | WO9602882 | 2/1996 |
| WO | WO2006024965 | 3/2006 |

OTHER PUBLICATIONS

Reza Nabi, "A Service Oriented Crop Profitability Simulator realizing with Web Services", available at <http://cis895.nabi.us>, published on May 2010, 147 pages.*

*Primary Examiner* — Reza Nabi
(74) *Attorney, Agent, or Firm* — Law Office of Gerald Maliszewski; Gerald Maliszewski (57) ABSTRACT

A method is provided for an electronics device user interface (UI) to create a rules-validated service request. Initially, a UI device presents a plurality of selections, and accepts a selection command from a user. A UI application sends the selection command to a rules engine. The rules engine compares the selection command to a rules collection cross-referencing selection commands to allowable selection commands, wherein a rule is defined as a relationship between service parameters. In response to the rules engine validating the selection commands, the UI application sends a service request including the selection commands to a service device, and the service device performs a service defined in the service request. In response to the rules engine invalidating the selection command, the UI device may present an explanation of a rule violation associated with the invalid selection command. An associated system is also provided.

19 Claims, 4 Drawing Sheets

(56) References Cited

U.S. PATENT DOCUMENTS

| | | | | |
|---|---|---|---|---|
| 2003/0184585 A1* | 10/2003 | Lin | G06F 8/38 | 715/763 |
| 2005/0108625 A1* | 5/2005 | Bhogal | G06Q 10/10 | 715/221 |
| 2006/0015847 A1* | 1/2006 | Carroll | G06F 8/38 | 717/109 |
| 2006/0106897 A1* | 5/2006 | Sapozhnikov | G06F 8/38 | |
| 2007/0094204 A1* | 4/2007 | Huelsman | G06N 5/04 | 706/47 |
| 2007/0150805 A1* | 6/2007 | Misovski | G06F 8/38 | 715/234 |
| 2008/0320151 A1* | 12/2008 | McCanne | H03M 7/30 | 709/228 |
| 2009/0031235 A1* | 1/2009 | Martin | G03G 15/502 | 715/765 |
| 2009/0157201 A1* | 6/2009 | Oguri | G06F 3/0488 | 700/83 |
| 2009/0204675 A1* | 8/2009 | Glover | G06Q 10/107 | 709/206 |
| 2010/0180204 A1* | 7/2010 | Mathur | G06F 3/1203 | 715/744 |
| 2010/0318476 A1 | 12/2010 | Huelsman et al. | | |
| 2011/0078103 A1* | 3/2011 | Teng | G06F 9/4443 | 706/47 |
| 2011/0088011 A1* | 4/2011 | Ouali | G06F 8/10 | 717/105 |
| 2012/0036434 A1* | 2/2012 | Oberstein | G06F 3/0482 | 715/702 |
| 2013/0326407 A1* | 12/2013 | van Os | G01C 21/00 | 715/810 |

* cited by examiner

Fig. 1

RULES BASED USER INTERFACE ARCHITECTURE

BACKGROUND OF THE INVENTION

1. Field of the Invention

This invention generally relates to a user interface (UI) device and, more particularly, to a UI using a database of rules to send validated requests to a service device to fulfill.

2. Description of the Related Art

In many user interfaces that select optional parameter settings, not all combinations of settings are valid. In a model-view controller UI design there are two entities; a rules-based state machine (i.e. the model) and the view controller. This is a master-slave relationship where the model state machine tells the view controller what to display and how to display it. Take for example the UI for a conventional multi-functional peripheral (MFP), which may perform among many other possible tasks, printing or copying. The model runs on one processor and the view controller runs on another processor. The view controller "draws" the UI screen, based on information provided by the model controller. Each time the user selects a button on the UI, the view controller checks with the model controller to learn what to change on the screen, if anything at all. Using the model-view controller architecture, the options shown in the UI are always accurate and up to date. It is not (or should not be) possible to choose an invalid setting. But this feature comes at the cost of performance-sapping and verbose real-time event communication between the model and view controllers.

Service oriented architecture (SOA) software architecture is based on discrete pieces of software providing application functionality as services to other devices or applications. A service is a self-contained unit of functionality, such as printing a document. SOA makes it easy for devices and applications connected over a network to cooperate without the need to make changes to the underlying program itself.

The purpose of SOA is to allow users to combine together fairly large chunks of functionality to form ad hoc applications built almost entirely from existing software services. The main benefit of SOA is to allow simultaneous use and easy mutual data exchange between programs of different vendors without additional programming or making changes to the services.

With SOA, an application UI interacts with the user to select optional parameter settings. Generally, the UI assumes that all setting combinations are valid, because it has limited knowledge of the rules that constrain the device or service. The user-selected settings are gathered into a "job ticket" and submitted to the service device for "validation". If the job ticket is rejected because it contains invalid or inconsistent settings, there is little, if any, useful information available to the user that helps to correct the problem.

One classic UI element that locally implements a constraint rule is the graphical user interface (GUI) "radio button". This setting allows the user to select one (but only one) of many optional settings. Any previously selected radio button in the same group becomes deselected. Common user interfaces incorporate many radio button elements; separating the settings within a single radio button but not constraining setting combinations between multiple radio buttons.

Rules engines have traditionally been used by "truth finding" or "inference" expert systems and to implement business "production rules" (a.k.a. "work flow"). In logic, an inference rule is a logical form consisting of a function which takes premises, analyzes their syntax, and returns a conclusion (or conclusions). For example, the rule of inference called modus ponens takes two premises, one in the form "If p then q" and another in the form "p", and returns the conclusion "q". The rule is valid with respect to the semantics of classical logic, in the sense that if the premises are true (under an interpretation), then so is the conclusion.

It would be advantageous if a method existed that insured a valid combination of optional settings even when the device that displays a UI is separated from the device or services it controls.

SUMMARY OF THE INVENTION

Disclosed herein is a user interface (UI) that builds device service requests using an imported set of rules that may express allowed setting combinations, disallowed setting combinations, or both, and arbitrary action(s) to be taken when specific combinations are selected. A rules engine in communication with the UI interprets the rules and identifies invalid setting combinations. The UI displays the optional parameter settings to the user, and interacts with the rules engine to prevent the user from selecting invalid combinations of parameter settings. Thus, tabular codified rules and the rules engine replace inline computer source code. A list of rules is easier to write, edit, and to maintain than is the equivalent combinatorial logic scattered throughout source code.

The rules engine may be located on either the client-side or the server-side of the connection. The rules can be a simple list of invalid pairs of parameter settings (e.g. "if paper size=A6-R, then disable duplex printing"), or a rich symbolic language for non-paired interactions (e.g. "A and B but not C") or anything in between. The rules may be "discoverable" by querying a device or service, or they may be hard coded into the UI application.

Various means may be used to optimize performance and to access the rules. The user benefits from the "instant-feedback" nature of a connected device, without the need for a direct real-time connection to that controlled service or device. The iterative job ticket "validation" steps in a conventional service-oriented-architecture can be eliminated. By constructing always-valid job tickets, this method avoids the user frustration of rejected job tickets. Thus, the rules engine is enabled as a simple rules checker. It is generic and not product or model specific, and combines the advantages of model-view and service-oriented architectures.

Accordingly, a method is provided for an electronics device user interface to create a rules-validated service request. Initially, a UI device, enabled for example as a keyboard and display, presents a plurality of selections, and accepts a selection command from a user. A UI application sends the selection command to a rules engine. The rules engine, which may be stored in local memory with the UI application or in the memory of a network-connected device, compares the selection command to a rules collection cross-referencing selection commands to allowable selection commands. A rule is defined as a relationship between service parameters. In response to the rules engine validating one or more selection commands, the UI application sends a service request including the selection commands to a service device, and the service device performs a service defined in the service request. In response to the rules engine invalidating the selection command, the UI device may present an explanation of a rule violation associated with the invalid selection command.

In one aspect, prior to the UI device presenting the plurality of selections, the UI application downloads the rules collection from the service device, and sends the rules collection to the rules engine. In another aspect, the UI application sends the plurality of selections to the rules engine prior to the UI device presenting the plurality of selections to the user. The rules engine can then acknowledge valid selections, so that UI device presents only valid selections to the user.

Additional details of the above-described method and a system for creating a rules-validated service request are presented below.

DETAILED DESCRIPTION

Figure 1:
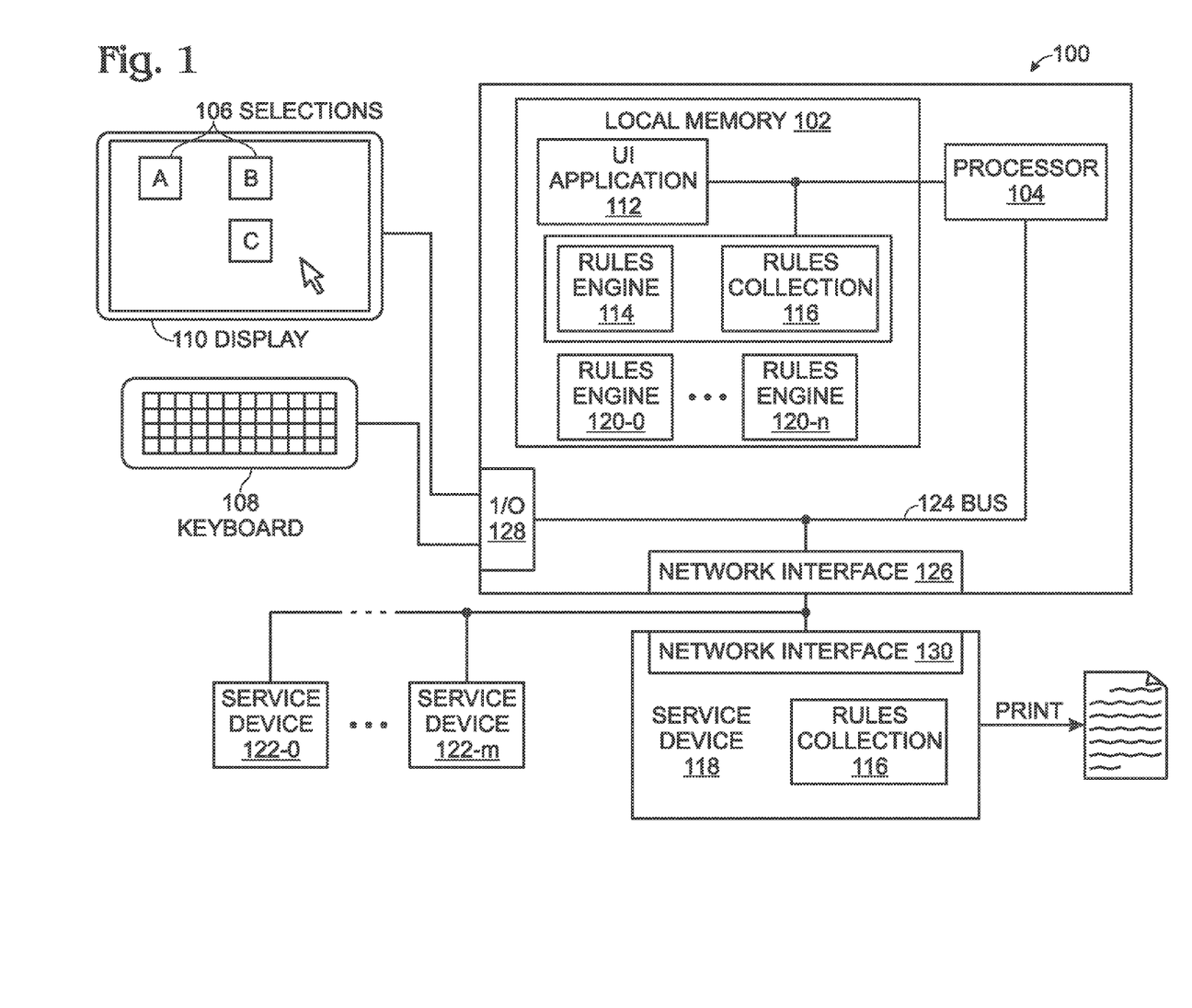
FIG. 1 is a schematic block diagram of a system for creating a rules-validated service request.

FIG. 1 is a schematic block diagram of a system for creating a rules-validated service request. The system 100 comprises a non-transitory local memory 102, a processor 104, and a user interface (UI) device for presenting a plurality of selections 106 and accepting a selection command from a user. Here, the UI device is represented by a keyboard 108 and display 110. However, many other means are known for a user to interact with a UI device including a mouse, voice commands/responses, hand movement, touchpad, touchscreen, trackball, stylus, cursor direction keys, and optical recognition to name a few. The system 100 is not limited to any particular type of UI device(s).

A UI application 112 is enabled as a sequence of processor executable instructions stored in the local memory 102. The UI application 112 sends the selection command to a rules engine 114 for validation. The rules engine 114 is enabled as a sequence of processor executable instructions stored in a non-transitory memory. Here, the rules engine 114 is shown stored in local memory 102. Alternatively, the rules engine may also be stored in the non-transitory memory of a network-connected device (see FIG. 3). The rules engine 114 includes a rules collection 116. A rule is defined herein as a relationship between (device) service parameters. The rules collection 116 cross-references selection commands to allowable selection commands. Thus, the rules engine 114 compares the selection command sent by the UI application 112 to the rules collection 116.

In response to the selection commands being validated, the UI application 112 sends a service request including the selection command to a first service device 118 for performance of a service. While it is possible that a service request is created after the UI application receives, and the rules engine validates, just a single selection command, the more likely scenario is that the service request is created after the receipt and validation of several selection commands, as it likely takes several selection commands to define the service to be performed. For example, the first service device 118 may be a multifunctional peripheral (MFP) service device capable of performing one or more of the following services: printing (as shown), scanning, copying, faxing, emailing, optical character recognition (OCR), language translation, Bates stamping, and document filing.

In should be understood that a service request is not limited to just MFP-related services. Rather, a service request is defined herein as a request for any type task to be performed, where the request is generated in cooperation with a UI. Other possible tasks may be associated with the submission of online populated forms, such as might be generated for an online banking, credit, or loan applications. Other tasks might be associated with online purchases, product reviews, appointment scheduling, and questionnaires. The system described herein is not limited to the performance of any particular type of tasks.

The system 100 may be enabled as a computer device that typically employs a bus 124 or other communication mechanism for communicating information coupled to the processor 104. The local memory 102 may also include a random access memory (RAM) or other dynamic storage device, coupled to the bus 124 for storing information and instructions to be executed by processor 104. These memories may also be referred to as a computer-readable medium. The execution of the sequences of instructions contained in a computer-readable medium may cause a processor to perform some of the steps associated with validating service requests. Alternately, some of these functions may be performed in hardware. The practical implementation of such a computer system would be well known to one with skill in the art.

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, an electromagnetic or optical carrier wave, or any other medium from which a computer can read.

The system 100 may be a workstation, personal computer, tablet, server, or handheld device. Some examples of a handheld device include a calculator, personal digital assistant (PDA), cell phone, smart phone, tablet, or notebook computer. The system 100 may also comprise a network interface 126 (e.g. an Ethernet card) for connection to the first service device 118 via a network, an input/output (I/O) interface 128 (e.g. USB ports) for connecting the UI devices 108 and 110 to the bus 124, and service device network interface 130. The physical communication links may be optical, wired, or wireless.

Figure 2:
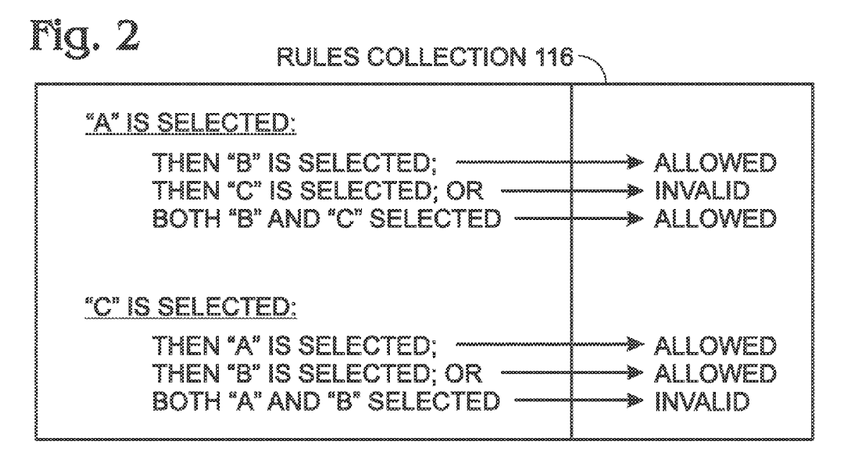
FIG. 2 is a schematic block diagram of an exemplary rules collection data base.

FIG. 2 is a schematic block diagram of an exemplary rules collection data base.

Returning to FIG. 1, the UI application 112 downloads the rules collection 116 from the first service device 118 prior to the UI device accepting the selection command, and sends the rules collection to the rules engine 114. More explicitly, the UI application 112 may send a query to the first service device 118 to determine available services, and in response to receiving an acknowledgement from the first service device, requests that the rules collection 116 be sent for the available services.

In another aspect, the UI application 122 sends the rules collection 116 to a rules engine selected from among a plurality of rules engines including the selected rules engine 114 and rule engines 120-0 through 120-n. Typically, a "local"

rules engine (i.e. one that resides and runs on the UI device) is generally preferred over a "remote" rules engine (i.e. one that is network-connected). However, rules specification formats vary and any given rules engine that runs locally may not be able to parse the rule set for a particular service of interest to the user. In this case there may be a rules engine on the network that can parse the rules for the service of interest. In another aspect, the rules may be so complex that a rules engine associated with a "super-computer" is required to validate the rules. In addition, any given rules-based application UI may be a combination of multiple services, hosted on different devices on the network. Some of these services may not be able to provide "sharable rules" for their services. In which case, these services preferably provide a query-able rules engine.

In one aspect, the rules engine 114 sends an explanation of a rule violation to the UI application 122 in response to an invalid selection command, and the UI device 110 presents the explanation to the user. In one variation, the user may simply "hover" their finger over a potential selection, and the UI device reports (or has previously reported) the potential selection to the UI application, which is passed on to the rules engine for validation. If the potential selection is invalid, the UI device may display (e.g. via a pop-up window) or otherwise indicate to the user that the command will be invalid (disabled) if selected. Further, the reason for invalidity may likewise be presented.

However, in a preferred aspect the UI application 112 sends the plurality of selections to the rules engine 114 for validation prior to the presentation of the plurality of selections 106, so that only valid selections are presented by the UI device 110. Rather than the UI device allowing the user to select an invalid setting, and then informing the user of the conflict, but only after the fact, it becomes impossible for the user to select an invalid setting in the first place if the UI application checks for validity prior to the presentation of selections. The UI device can, for example, hide any setting values that violate existing rules.

In one aspect, the UI application 112 may check the validity selection commands for a plurality of service devices, including service 118 and service devices 122-0 through 122-m. More explicitly, the UI device 108 may sequentially accept selection commands associated with corresponding service devices, for example accepting printing commands for service devices 118 and scanning service commands for service device 122-0. The UI application 112 then sends selection commands to a rules engine for corresponding service devices. For example, the UI application 112 sends selection commands for service device 118 to rules engine 114, and after receiving selection commands at a later time for service device 122-0, may likewise send these (122-0) service commands to rules engine 114. Of course in this case, the rules engine includes a different rules collection associated with service device 122-0. Alternatively, the UI may send the selection commands for 122-0 to a different rules engine, for example rules engine 120-0, which would hold a rules collection (not shown) associated with service device 122-0. The rules engine 114, or alternatively rules engines 114 and 120-0, would then compare the selection commands to a rules collection for corresponding service devices. As a result, the UI application 112 sends service requests to the corresponding service devices 114 and 122-0.

Figure 3:
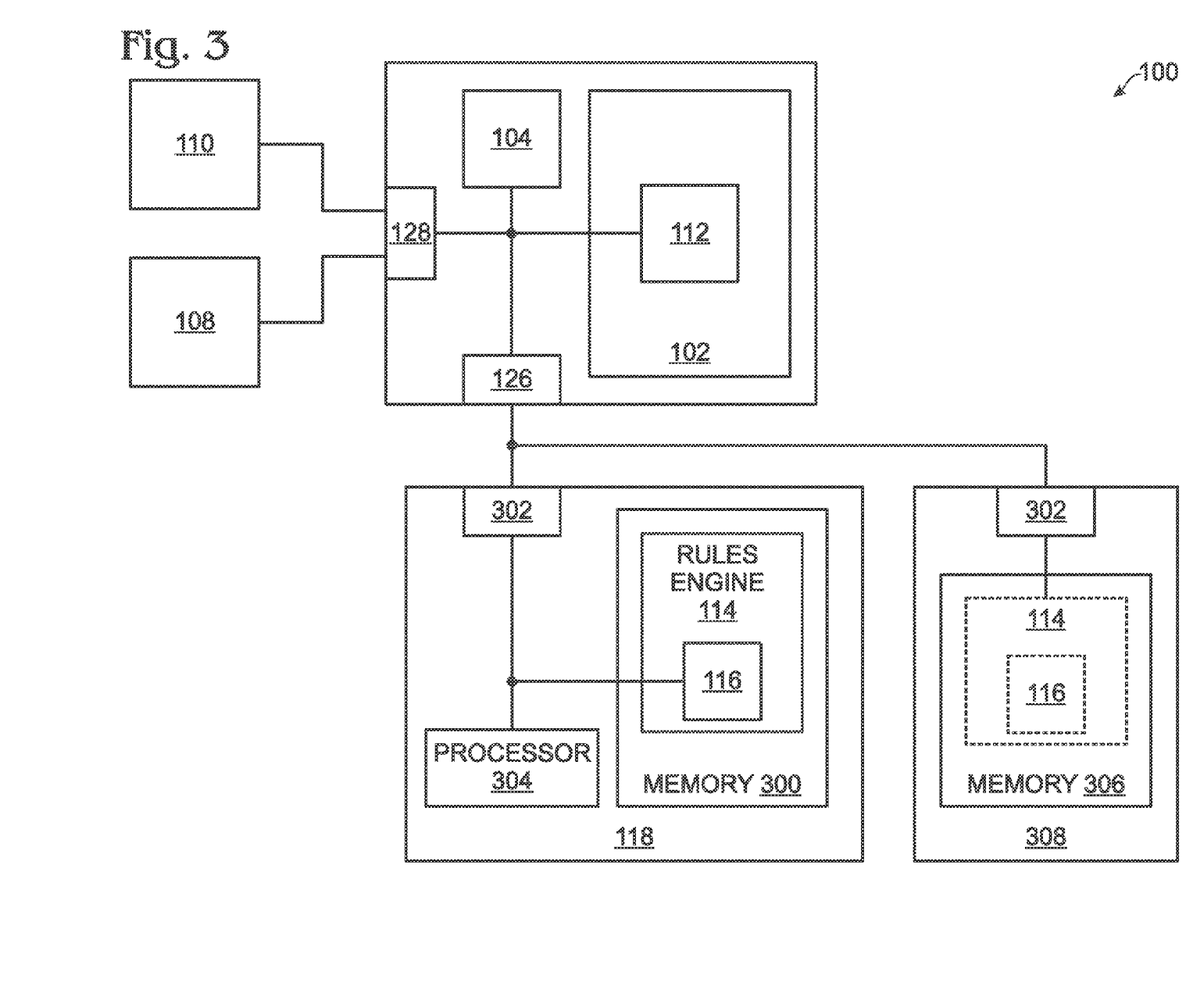
FIG. 3 is a schematic block diagram variation of the system described by FIG. 1, where the rules engine is stored in the non-transitory memory of a network-connected device.

FIG. 3 is a schematic block diagram variation of the system described by FIG. 1, where the rules engine is stored in the non-transitory memory of a network-connected device. In one aspect, the rules engine 114 may be stored in the memory 300 of the first service device 118, and accessed via the network interface 302 in cooperation with processor 304. Alternatively, the rules engine (depicted in phantom) may be stored in the memory 306 of a device 308 that is network-connected to both the UI application 112 and the first service device 118.

Figure 4:
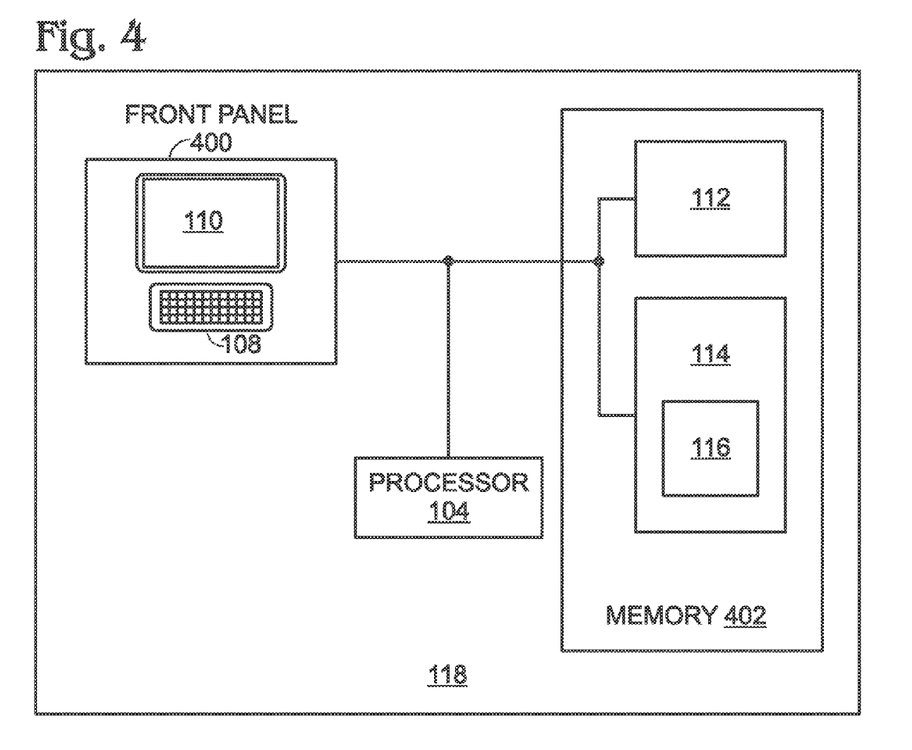
FIG. 4 is a schematic block diagram of the system embedded in the first service device.

FIG. 4 is a schematic block diagram of the system embedded in the first service device. The UI device 108/110 is first service device front panel 400. The UI application 112, rules engine 114, and rules collection are stored in the non-transitory memory 402 of the first service device 118, as operated in cooperation with processor 404.

The above-described system enables a UI for a computer application that chooses optional parameter settings for a service or a device. In particular this system uses a database of rules to constrain parameter settings to allowable combinations. The system includes a service oriented device (e.g. an MFP), a set of services and capabilities, a set of current and default parameter values, a set of constraint rules for those parameter values, a user interface application with a fixed (e.g. attached front panel) or mobile (e.g. a detached tablet PC) UI display, and a rules engine to interpret the rules. The default settings are presumed to be self-consistent and to be compliant with the setting rules.

At boot or connection time the MFP may describe its services and capabilities to a remote UI. Those services and capabilities include:
1. A list of services. (e.g. Copy, Scan, Fax, . . . );
2. A list of parameters for each service. (e.g. Copies, duplex, . . . );
3. A list of allowable values for each parameter. (e.g. {1-99}, {1-sided, 2-sided booklet, 2-sided tablet}, . . . );
4. A list of default settings for each parameter. (e.g. 1, 1-sided, . . . );
5. A list of rules that define conflicting settings.

The user selects a service and one or more job settings by interacting with the UI application. When the user interface session begins, the UI application creates an internal list of current job parameters from the default parameter and setting values it received from the MFP. When the user selects a service, the application consults with its rules processor and draws a screen showing selected job settings with their default values. The user may then select any enabled parameter and setting value, one at a time.

The basic operating paradigm for the UI application is as follows:
1. The user selects an enabled parameter or setting value.
2. The application changes the "current value" for this job parameter.
3. The application checks for any rules based on the changed setting value(s).
4. Newly enabled parameters or settings are made accessible to the user.
5. Newly disabled parameters or settings are made inaccessible to the user.
6. The UI screen is redrawn.

A parameter (e.g. duplex) may be unavailable to the user because it is not a capability of the MFP. Or a setting (e.g. 2-sided booklet) may be disabled because of a previously selected job setting. In either case, the user interface application can discover the constraint by consulting with the rules engine before drawing the UI screen. By following the advice of the rules engine, the user interface application prevents the selection of any inappropriate or invalid job settings.

In this context, a service is an action or sequence of actions performed by a device. Service parameters control the features of a related service. A rule expresses a relationship between two or more service parameters. A rules database is a system entity that stores collections of rules. A rules database may exist within one or more system entities. So, for example, there may be a rules database in the MFP (for permanent storage) and another rules database in the UI device (for temporary or cached storage). A rules engine compares a collection of service parameters (called a job ticket or service request) to a set of rules relating to that service. The job of the rules engine is to identify incompatible settings.

The following sequence of operations generally describes the creation of a validated service request by a UI. Again, as a specific example, the service device may be an MFP.

1) The UI device "connects" to the service device.
   The service device responds with a job ID.
2) The UI device "asks" what services are available from the service device.
   The service device responds with a list of available services.
3) The UI device "asks" the service device for the scan service rules.
   The service device responds by sending the rules to the scan service.
4) The UI device sends the scan rules to the rules engine application.
   The rules engine application parses the scan rules and stores them locally and in a more readily processed format.
5) The UI device asks the service device for "default parameters".
   The service device responds by sending the "default job ticket" to the UI device.
6) The UI device copies the "default job ticket" into the "current settings" job ticket.
7) The UI device presents a display of default parameters to the user and interacts with that user to change zero or more settings.
8) Each time the user changes a "current setting" value, the UI device does the following:
   a. Changes the value of the selected setting in the "current setting" job ticket.
   b. Communicates with the rules engine to check that all setting parameters that are displayed for the user against the newly selected value.
      i. If a setting parameter is consistent with the newly selected parameter value, that setting is "enabled" for future changes.
      ii. If a setting parameter is now inconsistent with the newly selected value, its setting is disabled for future changes.
9) Repeat Step 8 until the user is satisfied with the settings, as demonstrated by selecting the "Execute" button.
10) The UI device sends the "current settings" job ticket to the service device for processing.

The actions implied by the terms "ask" and "send" are implementation dependent. There are a multitude of methods for doing so that would be familiar to anyone skilled in the art.

In theory, if settings have not changed, the default parameter values (as supplied by the MFP) can be sent back to the MFP in a job ticket without checking. And in this one scenario, the rules engine would not have to be called. Furthermore, if the UI consults with the rules engine after every parameter change, it is not necessary to call the rules engine again, in theory. In practice, however, it would be prudent to check the job ticket "one last time" before sending it to the MFP.

Figure 5:
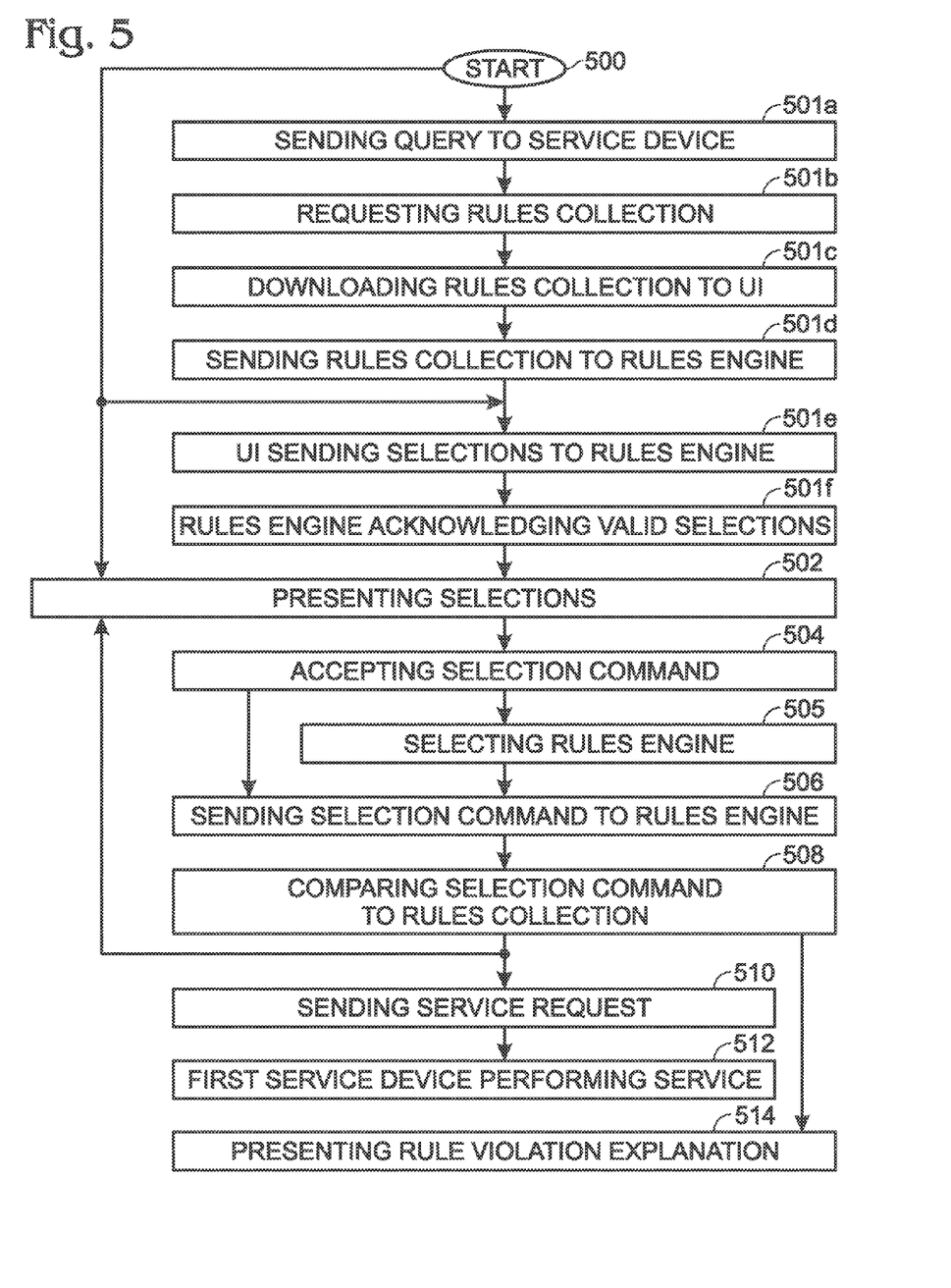
FIG. 5 is a flowchart illustrating a method for a user interface (UI) to create a rules-validated service request.

FIG. 5 is a flowchart illustrating a method for a user interface (UI) to create a rules-validated service request. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The schematic drawings depicted in FIGS. 1-4 aid in the understanding of the flowchart. The method starts at Step 500.

In Step 502 a UI device presents a plurality of selections. For example, the UI device may be embedded in a first service device front panel or an electronic device network-connected to the first service device. In Step 504 the UI device accepts a selection command from a user. In Step 506 a UI application, enabled as a sequence of processor executable instructions stored in a non-transitory local memory of the electronic device, sends the selection command to a rules engine. The rules engine is enabled as a sequence of processor executable instructions stored in a non-transitory memory such as the local memory or a non-transitory memory of a network-connected device. In Step 508 the rules engine compares the selection command to a rules collection. The rules collection cross-references selection commands to allowable selection commands. A rule is defined as a relationship between service parameters. Alternatively, or in addition, the rules collection cross-references selection commands to an allowable sequence of selection commands. In one variation, prior to the UI application sending the rules collection to the rules engine in Step 506, in Step 505 the UI application selects the rules engine from among a plurality of rules engines.

In response to the rules engine validating the selection command, the UI application in Step 510 sends a service request including the selection command to a first service device. As noted above, a service request may be created in response to a single selection command, but the more likely case is that several service commands are needed to define a service, and the service request is only created after all the selection commands have been validated. In Step 512 the first service device performs a service defined in the service request. In response to the rules engine invalidating the selection command, in Step 514 the UI device presents an explanation of a rule violation associated with the invalid selection command.

In one aspect, in Step 510 the UI application sends the service request to a MFP service device, and in Step 512 the MFP performs one or more of the following services: printing, scanning, copying, faxing, emailing, optical character recognition (OCR), language translation, Bates stamping, and document filing.

In another aspect, prior to the UI device presenting the plurality of selections in Step 502, in Step 501a the UI application sends a query to the first service device to determine available services. In response to receiving an acknowledgement from the first service device, in Step 501b the UI application requests that the rules collection be sent for the available services. In Step 501c the UI application downloads the rules collection from the first service device, and in Step 501d the UI application sends to rules collection to the rules engine. In one variation, the UI application sends the plurality of selections to the rules engine in Step 501e, and in Step 501f the rules engine acknowledges valid selections. Then, in Step 502 the UI device presents only valid selections.

In one aspect, in Step 504 the UI device sequentially accepts selection commands associated with corresponding service devices, and in Step 506 the UI application sends selection commands to a rules engine (one or more rules engines) for corresponding service devices. Then, in Step 510 the UI application sends service requests to corresponding service devices.

A system and method have been provided for a UI to create a validated device service request. Examples of particular messages, process steps, and hardware units have been presented to illustrate the invention. However, the invention is not limited to merely these examples. Other variations and embodiments of the invention will occur to those skilled in the art.

We claim:

1. In an electronic device, a method for a user interface (UI) to create a rules-validated service request, the method comprising:
    a UI device presenting a plurality of selections;
    the UI device accepting a selection command from a user;
    a UI application, enabled as a sequence of processor executable instructions stored in a non-transitory local memory of the electronic device, sending the selection command to a rules engine;
    the rules engine, enabled as a sequence of processor executable instructions stored in a non-transitory memory, comparing the selection command to a rules collection cross-referencing selection commands to allowable selection commands, wherein a rule is defined as a relationship between service parameters;
    in response to the rules engine validating the selection command, the UI application sending a service request including the selection command to a first service device; and,
    the first service device performing a service defined in the service request,
    wherein prior to the UI device presenting the plurality of selections, the UI application downloading the rules collection from the first service device; and, the UI application sending said rules collection to the rules engine,
    wherein prior to downloading the rules collection, the UI application sending a query to the first service device to determine available services and applicable rules.

2. The method of claim 1 further comprising:
    prior to the UI device presenting the plurality of selections, the UI application sending the plurality of selections to the rules engine;
    the rules engine acknowledging valid selections; and,
    wherein the UI device presenting the plurality of selections includes the UI device presenting only valid selections.

3. The method of claim 1 wherein the UI application sending the selection command to the rules engine includes sending the selection command to a rules engine stored in a location selected from a group consisting the local memory and a non-transitory memory of a network-connected device.

4. The method of claim 1 further comprising:
    in response to sending the query to the first service device and receiving an acknowledgement from the first service device, the UI application requesting that the rules collection be sent for the available services.

5. The method of claim 1 further comprising:
    prior to the UI application sending the rules collection to the rules engine, the UI application selecting the rules engine from among a plurality of rules engines.

6. The method of claim 1 wherein the rules engine comparing the selection command to the rules collection includes the rules collection cross-referencing selection commands to an allowable sequence of selection commands.

7. The method of claim 1 further comprising:
    in response to the rules engine invalidating the selection command, the UI device presenting an explanation of a rule violation associated with the invalid selection command.

8. The method of claim 1 wherein the UI device accepting the selection command includes the UI device sequentially, accepting selection commands associated with corresponding service devices;
    wherein the UI application sending the selection command to the rules engine includes the UI application sending selection commands to a rules engine for corresponding service devices; and,
    wherein the UI application sending the service request includes the UI application sending service requests to corresponding service devices.

9. The method of claim 1 wherein the UI device is embedded in a device selected from a group consisting a first service device front panel and an electronic device network-connected to the first service device.

10. The method of claim 1 wherein the UI application sending the service request to the first service device includes the first service device being a multifunctional peripheral (MFP); and,
    wherein the first service device performing the service defined in the service request includes the MFP performing a service selected from a group consisting of printing, scanning, copying, faxing, emailing, optical character recognition (OCR), language translation, Bates stamping, document filing, and combinations of the above-listed functions.

11. A system for creating a rules-validated service request, the system comprising:
    a non-transitory local memory;
    a processor;
    a user interface (UI) device for presenting a plurality of selections and accepting a selection command from a user;
    a UI application, enabled as a sequence of processor executable instructions stored in the local memory, sending the selection command to a rules engine for validation;
    the rules engine, enabled, as a sequence of processor executable instructions stored in a non-transitory memory, including a rules collection, where a rule is defined as a relationship between service parameters, where the rules collection cross-references selection commands to allowable selection commands, and where the rules engine compares the selection command sent by the UI application to the rules collection; and,
    wherein the UI application, in response to the selection command being validated, sends a service request including the selection command to a first service device for performance of a service,
    wherein prior to the UI device presenting the plurality of selections, the UI application downloading the rules collection from the first service device; and, the UI application sending said rules collection to the rules engine,
    wherein prior to downloading the rules collection, the UI application sending a query to the first service device to determine available services and applicable rules.

12. The system of claim 11 wherein the UI application sends the plurality of selections to the rules engine for validation prior to the presentation of the plurality of selections, so that only valid selections are presented by the UI device.

13. The system of claim 11 wherein the rules engine is stored in a memory selected from a group consisting of the local memory and in a non-transitory memory of a network-connected device.

14. The system of claim 11 wherein the UI application sends a query to the first service device to determine available services, and in response to receiving an acknowledgement from the first service device, requests that the rules collection be sent for the available services.

15. The system of claim 14 wherein the UI application sends the rules collection to a rules engine selected from among a plurality of rules engines.

16. The system of claim 11 wherein the rules engine sends an explanation of a rule violation to the UI application in response to an invalid, selection, command; and, wherein the UI device presents the explanation to the user.

17. The system of claim 11 wherein the UI device sequentially accepts selection commands associated, with corresponding service devices;

wherein the UI application sends selection commands to a rules engine for corresponding service devices;

wherein the rules engine compares the selection commands to a rules collection for corresponding service devices; and, wherein the UI application sends service requests to the corresponding service devices.

18. The system of claim 11 wherein the UI device is selected, from a group consisting of a first service device front panel and an electronic device network-connected to the first service device.

19. The system of claim 11 further comprising:

a multifunctional peripheral (MFP) service device capable of performing a service selected from a group consisting of printing, scanning, copying, faxing, emailing, optical character recognition (OCR), language translation, Bates stamping, document filing, and combinations of the above-listed functions.

* * * * *